Jan. 11, 1955   J. A. CHILMAN   2,699,303
MEANS FOR ELECTRICALLY HEATING
THE SPINNERS OF AIRSCREWS
Filed Oct. 22, 1948
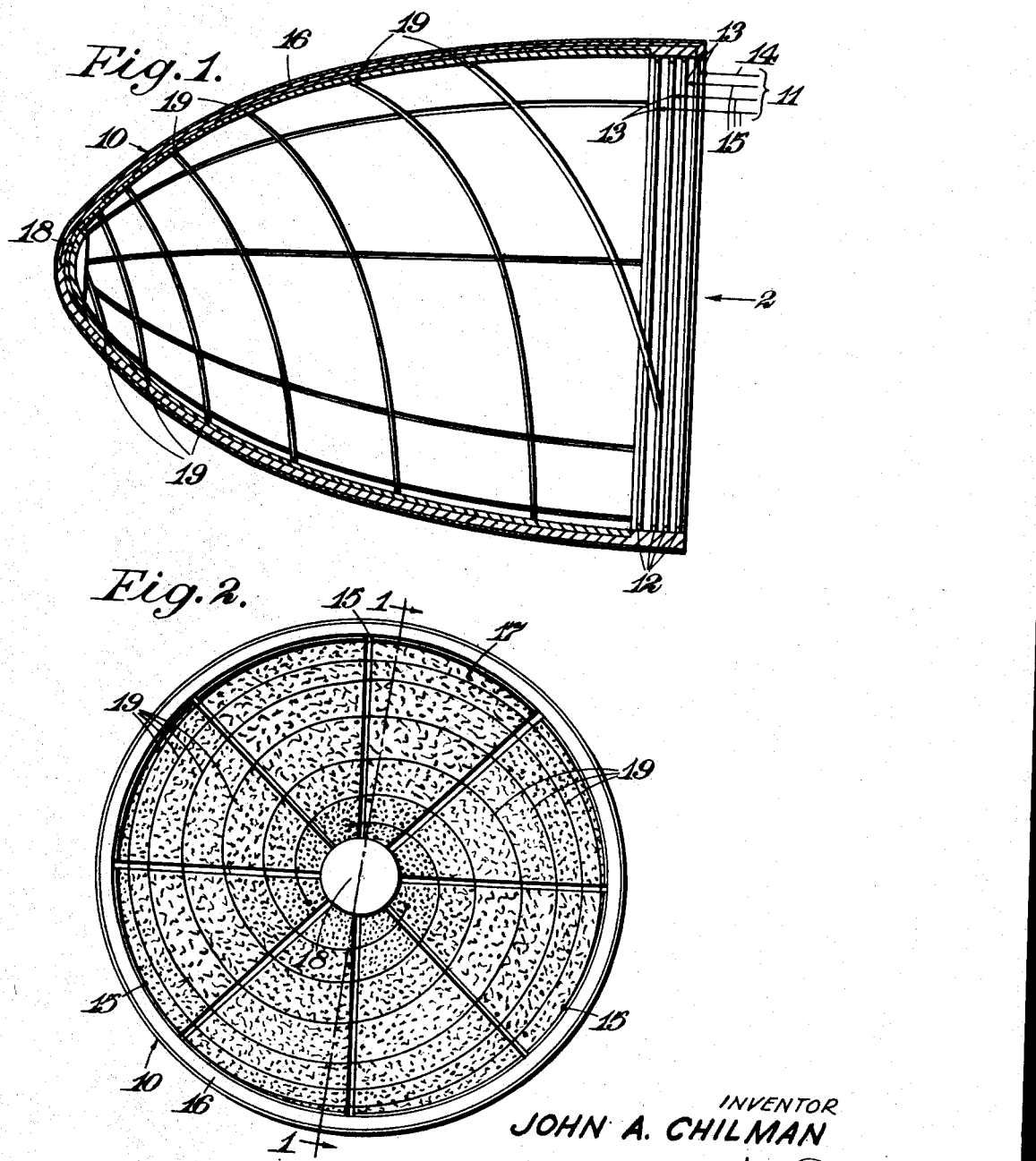
INVENTOR
JOHN A. CHILMAN
by Wilkinson Mawhinney
Attorneys

United States Patent Office 2,699,303
Patented Jan. 11, 1955

2,699,303

MEANS FOR ELECTRICALLY HEATING THE SPINNERS OF AIRSCREWS

John Alfred Chilman, Gloucester, England, assignor to Rotol Limited, Gloucester, England, a British company Application October 22, 1948, Serial No. 56,038

Claims priority, application Great Britain October 24, 1947

3 Claims. (Cl. 244—134)

This invention concerns means for electrically heating the spinners of airscrews to reduce or prevent the formation of ice thereon hereinafter referred to as "de-icing."

The invention has for one of its objects to provide means for electrically heating a spinner by an alternating current supply in which a non-uniform heating effect is obtained over the surface of the spinner whilst a balanced load is provided for the current supply. Usually it is required that a greater heating effect per unit of area be provided at the nose of the spinner as this is the region most liable to ice formation.

According to the present invention there is provided the combination with a spinner for an airscrew of electrical means for heating the spinner from a source of alternating current supply characterised in that for each phase of the supply there is provided an electric heating element, the resistance of the elements being the same so that a balanced load is obtained and the resistance being non-uniform over the length of each element so that the heat evolved per unit of area of the spinner varies over the surface thereof.

According to a feature of this invention three heating elements are connected to a three-phase supply in star formation, the neutral conductor being at the nose of the spinner and the line conductors being equi-spaced thereabout.

The surface of the spinner may be coated with, or carry a sheath coated with, a conducting layer of carbon-black or the like which is connected with the line and neutral conductors of the current supply, said layer having a variable thickness so that its resistance, and hence the heat evolved per unit of area, varies over the spinner.

Preferably the line conductors are spirally wound and applied to the layer the distance between adjacent line conductors on the layer being varied to produce a different heat evolution at different parts of the layer.

One embodiment of the present invention will now be described, by way of example only, with reference to the accompanying drawings whereof, Figure 1 is a diagrammatic sectional elevation on the line 1—1 of Figure 2 showing a spinner in accordance with the present invention, and Figure 2 is a diagrammatic view in the direction of arrow 2 of Figure 1.

In the embodiment which is about to be described the spinner, which is generally indicated by the reference numeral 10, is connected to a three-phase alternating current supply, as at 11. The current is applied to the spinner through slip-rings 12 and brushes 13 in known manner. The neutral conductor 14 is connected to the nose of the spinner at the centre thereof as more fully described hereinafter. The three line conductors 15 are connected to terminals placed 120° apart around the trailing edge of the spinner—it is assumed that the spinner is being used with a tractor airscrew.

The spinner carries electrical heating means which is connected to the neutral conductor 14 and to the line conductors 15 through the slip-rings 12 and the brushes 13 so that heat is evolved over the surface of the spinner thereby reducing or preventing the formation of ice thereon. It is recognized that the nose portion of the spinner is most liable to ice formation and for this reason it is considered necessary for the electrical means associated therewith to evolve a correspondingly greater amount of heat per unit of area.

The interior surface of the spinner is covered by an insulating layer 16 to which there is applied a plurality of segment-shaped heating elements 17.

The heating elements are formed so as to fit the interior surface of the spinner, the elements being spaced apart by a small amount along their adjacent edges (see Figure 2).

A conducting cap 18 is carried at the nose of the spinner so that it engages the elements 17. The conducting cap 18 is connected with the neutral conductor 14. Three separate conductors 19 are spirally wound around the interior surface of the spinner so that they are in engagement with the elements 17 and each such spirally wound conductor is attached to a terminal which is connected with one of the slip-rings 12.

With the arrangement described the three-phase alternating current supply 11 is connected in star formation with the elements 17 and the conductors 19 are arranged so that the electrical load is balanced. Heat is evolved as the current passes along the elements 17 and by varying the spacing between the conductors 19 it is possible to arrange that the heat evolved per unit of area varies over the elements. In this way the heat evolved at the nose of the spinner may be made greater than at the outer portion thereof.

The heating elements 17 are preferably pre-shaped and then applied to the layer 16. To vary the resistance of the layer per unit of area so that a non-uniform heat evolution is produced (the hottest region being, for example, at the spinner nose) the conductors 19 are non-uniformly spaced over the spinner.

It is preferred to use a conducting layer of carbon-black having a constant thickness and to have non-uniform heat evolution by varying the spacing of the embedded conductors as described above. Heating elements are most conveniently made as described with reference to Figure 1. If a carbon-black layer is used this may be applied in any convenient and known manner, for example, by spraying.

The use of a three-phase supply having a neutral conductor is not essential—the neutral conductor may in certain circumstances be dispensed with.

I claim:

1. The combination with a spinner for an airscrew of electrical means for producing from a source of multi-phase alternating current supply localized heating areas of different temperatures for heating the spinner comprising a plurality of forwardly tapering segmental heating elements pre-formed to the spinner shape and applied thereto and conductors radiating from the nose of the spinner and wound spirally in a series of convolutions on to the heating elements, the number of conductors being equal to the number of phases of the supply and the convolutions of the spirally wound conductors in the nose area of the spinner being closer together than in the remaining areas of the spinner.

2. The combination with a spinner for an airscrew of electrical means for producing from a source of multi-phase alternating current supply having a line conductor for each phase and a neutral conductor a localized heating area of relatively high temperature for heating the nose area of the spinner and a localized heating area of a lesser temperature for heating the remaining area of the spinner comprising a conducting cap carried at the nose of the spinner and connected to the neutral conductor, a plurality of forwardly tapering segmental resistance heating elements preformed to the spinner shape and applied to the inner surface thereof and engaging said cap and heating conductors corresponding in number to that of the phases of the current supply, the resistance of each resistance element being the same and each line conductor being connected through its heating conductor to the neutral conductor through said cap to provide a substantially symmetrical star-connection arrangement, said heating conductors radiating from the nose of the spinner and being wound spirally in a series of convolutions upon the segmental resistance elements, the convolutions of the heating conductors in the nose area of the spinner being closer together than in the remaining areas of the spinner.

3. A spinner combination according to claim 2 wherein the parts of the segmental resistance elements lying between the cap and the adjacent portions of the heating conductors form the star connection arrangement and the parts of the segmental resistance elements lying between adjacent heating conductors provide a delta-connected arrangement, an insulating material conforms to the shape of and is affixed to the inner surface of the spinner, and the segmental resistance elements are affixed to the insulating material.

References Cited in the file of this patent

UNITED STATES PATENTS

| | | |
|---|---|---|
| 2,014,332 | Houlette | Sept. 10, 1935 |
| 2,035,306 | Fannin | Mar. 24, 1936 |
| 2,205,543 | Rideau et al. | June 25, 1940 |
| 2,406,367 | Griffith et al. | Aug. 27, 1946 |
| 2,429,061 | Hunter | Oct. 14, 1947 |
| 2,494,625 | Martin | Jan. 17, 1950 |

FOREIGN PATENTS

| | | |
|---|---|---|
| 525,452 | Great Britain | Aug. 28, 1940 |

OTHER REFERENCES

"Alternating Current Circuits" by Bryant and Correll (first edition), McGraw-Hill Book Co., Inc., 1925 (pages 162–166, 168, 169, 201).